United States Patent [19]

Stark

[11] 4,448,017
[45] May 15, 1984

[54] JEWELRY CHAIN LOOP ELEMENT AND METHOD OF ASSEMBLY

[76] Inventor: Jean R. Stark, 309 Second St., Belvidere, N.J. 07823

[21] Appl. No.: 371,724

[22] Filed: Apr. 26, 1982

[51] Int. Cl.³ ............................................. F16G 13/00
[52] U.S. Cl. ........................................... 59/80; 59/82; 63/4
[58] Field of Search .......................... 59/80, 81, 82, 78; 63/4; D11/13

[56] References Cited

U.S. PATENT DOCUMENTS

| | | | |
|---|---|---|---|
| 1,238,847 | 9/1917 | Vandeveld | 59/78 |
| 1,414,638 | 5/1922 | Grove | 59/80 |
| 2,789,380 | 4/1957 | Philmus | 59/80 |
| 3,360,923 | 1/1968 | Quisling | 59/78 |
| 3,386,240 | 6/1968 | Blumstein | 59/80 |

*Primary Examiner*—Daniel C. Crane
*Assistant Examiner*—David B. Jones
*Attorney, Agent, or Firm*—Jacques M. Dulin

[57] ABSTRACT

An improved jewelry chain loop element and method of assembly into single, double, triple, etc., chains in which the links are formed from soldered wire rings. One segment of each ring is crimped together so that the ring is formed into an approximate teardrop shape with one end having parallel wires and the other a loop. The loop may be flattened. Then an ornament, such as a bead, tube bezel, cup bezel or other ornament is formed or secured on the crimped end to form a combined fastening means and tip ornament. The crimped segment is bent upward at a 15-60 degree angle either before or after the bead or ornament is formed. The individual links are then assembled into the chain by placing the ornament of one link through the remaining loop of the next adjacent link and the loop crimped about the adjacent link's ornament. Alternatively, teardrop-shaped links may be cast as single links or as tandem (double, triple, etc.) links. A number of completed chains or single teardrop link elements may be connected (e.g., by soldering) parallel to each other at adjacent loops thereby forming a double, triple, etc. chain of greater width. A second ornament may be secured intermediate the tip ornament and the loop.

11 Claims, 12 Drawing Figures

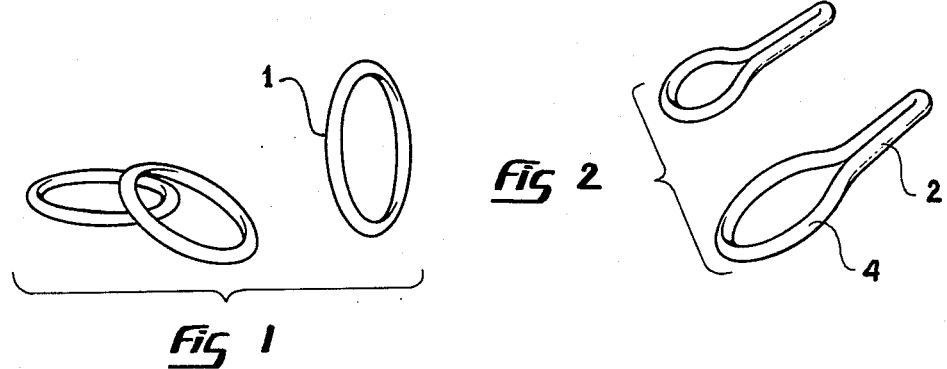
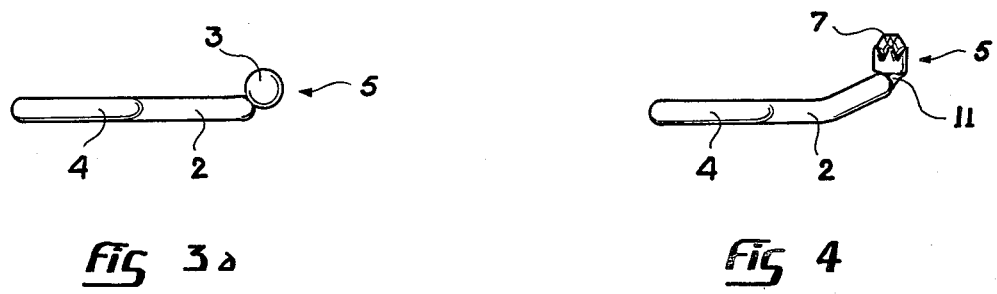
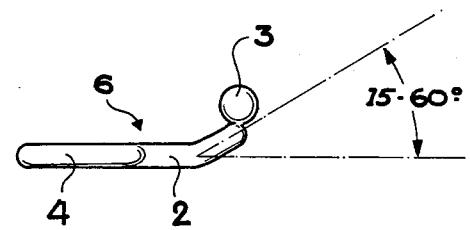
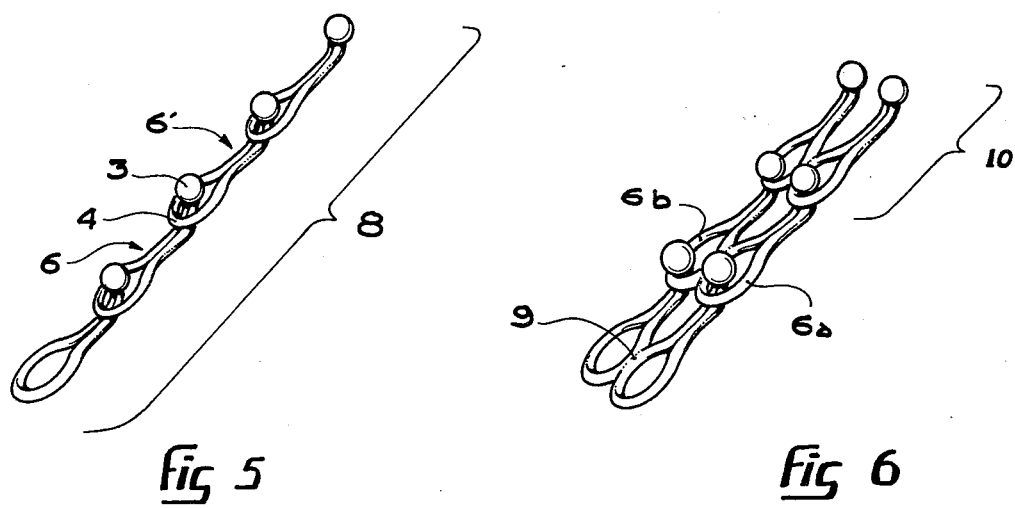

JEWELRY CHAIN LOOP ELEMENT AND METHOD OF ASSEMBLY

FIELD OF THE INVENTION

The invention relates to an improved jewelry chain loop element and method of assembly. The chain consists of a series of wire links which are joined by a series of simple steps. A number of completed chains or individual link elements may be connected to each other at adjacent loops thereby forming a chain of greater width. The links may employ a variety of ornaments, e.g., beads or bezels, as a part of the system of joining links in a sequence to form a chain. Alternately, the links may be cast either individually or as tandem (double, triple, etc.) links so as to increase the width of the chain.

BACKGROUND

Jewelry chains serve principally a decorative function to be used in a variety of manners. Jewelry chains may be used as garment belting or, more commonly, they are worn by the individual in the form of necklaces and bracelets. Typically, chains consist of a series of links often manufactured by hand and require patience, dexterity, and an artistic flair.

Various jewelry chains comprising plural loop elements and methods of assembly have been proposed in the past. For example, in Schoeninger U.S. Pat. No. 1,891,056 a thin, stamped, sheet metal link having three dome-shaped elements at the apexes of a triangle must be turned sideways to be inserted into a sequential link, and one dome element on a single tab is then bent back over a portion of the other two domes. The chain can be taken apart by rebending the one domed element, and any reverse bending of the chain could cause that dome element to be partially bent upward, disturbing its appearance and presenting a means to snag a garment.

Sweeney U.S. Pat. No. 1,797,968 illustrates a butterfly chain in which a pair of spring steel antenna wires are passed through a hole in the body of the subsequent link. The wires are crossed and can be pressed together to easily disengage them from the subsequent link. Since precious metal does not have the spring quality of steel, this assembly is not amenable to fine jewelry. The Philmus U.S. Pat. No. 2,789,380 and Quisling U.S. Pat. No. 3,360,923 chains are both designed so that the link consists of a shaft instead of a loop. In addition, the individual link element is not completed until it is joined to another link by forming a loop or eye around the shaft of the subsequent link.

Both Vanderveld U.S. Pat. No. 1,238,847 and Hodges U.S. Pat. No. 1,314,747 relate only to repair links. In Vanderveld, a head is formed after a shaft is passed through a loop in a rivet-type upsetting of metal process. In Hodges, the repair link is for tire chains, not an ornamental chain, and provides a T-shaped head that is bent to prevent disengagement of a subsequent link.

Accordingly, there is a need for an attractive jewelry chain which is simple to manufacture.

THE INVENTION

OBJECTS

It is among the objects of this invention to provide an improved jewelry chain link and its method of manufacture and assembly into single, double, triple, etc., chains which are quite attractive and marketable.

It is another object to provide jewelry chain links manufactured from wire rings and which thereafter are easily formed and assembled into a chain, which despite its simplicity is artistically elegant.

It is another object of this invention to provide a cast or soldered wire ring jewelry chain element.

It is another object to provide a jewelry chain assembled by inserting an ornamental portion, such as a bead or bezel, or one link through the loop of an adjacent link and crimping the loop around the enclosed ornamental portion.

It is another object to provide teardrop link elements which are connected (e.g., by soldering) parallel to each other at adjacent loops which may be assembled to form a double, triple, etc., chain of greater width.

It is another object to provide a jewelry chain link which may be cast, either individually, or as tandem (double, triple, etc.) links joined at the sides of their loops so that when assembled to similar links form a chain of increased width.

It is another object to provide a link of the type disclosed herein having a plurality of ornaments on each link.

Still other objects will be evident from the description and drawings.

SUMMARY

The jewelry chain link of this invention is formed from a soldered ring, one segment of which is crimped so as to form a teardrop shape with one end having parallel wires and the other end a loop. A bead, tube bezel, cup bezel, or other ornament is formed or secured on the crimped end forming a tip ornament. The crimped segment is bent upwardly at a 15-60 degree angle either before or after the tip ornament is formed or secured. The completed links may then be assembled by putting the tip ornament of one link through the loop of the next adjacent link and crimping the loop around the enclosed tip ornament. In an alternative embodiment, a number of completed chains or single teardrop link elements are laterally joined at adjacent loops parallel to each other thereby forming a double, triple, etc., chain of greater width. In the preferred embodiment, the links are cast as single links, or as tandem (double, triple, etc.) links which are joined at the sides of their loops, and when assembled to similar links form a chain of increased width.

By varying the length of the crimped segment the tip ornaments may be spaced close together on the final chain or farther apart, thus changing the aesthetic appearance of the chain. The loop may be flattened to accommodate different types of ornaments, e.g., cup ornaments. The crimp may be intermediate the tip and loop to leave a small loop at the tip into which a cup bezel will nest for soldering thereto. An ornament may be secured intermediate the tip ornament and loop for a double ornament chain. The ornaments in a chain need not be the same, but may be mixed: bead, bezel, etc.

BRIEF DESCRIPTION OF THE DRAWINGS

The drawings illustrate the principles of the invention which:

FIG. 1 is a perspective view of the soldered wire rings prior to crimping and flattening segments thereof;

FIG. 2 is a perspective view of the links after one ring segment has been crimped so that the ring is formed into an approximate teardrop shape with one end having parallel wires and the other end a loop;

FIGS. 3a and 3b are side views of a link with a bead ornament on the tip of the crimped segment; FIG. 3a being before bending up the bead end, and FIG. 3b showing the bent link;

FIG. 4 is a side view of a completed link having a tube bezel tip ornament after bending;

FIG. 5 is a perspective view of a section of the chain showing four links assembled by putting the bead of one link through the loop of the adjacent link and crimping the loop;

FIG. 6 is a perspective view of an alternative embodiment showing how two or more chains may be joined parallel to each other at the loop or how the teardrop-shaped links cast as tandem (double, triple, etc.) links may be assembled to form a chain of increased width;

DESCRIPTION OF THE PREFERRED EMBODIMENTS

Figure 7A:
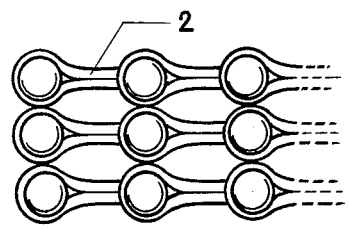
FIG. 7a is a plan view showing how a triple chain appears.
Figure 7B:
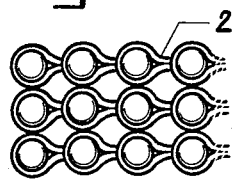
FIG. 7b shows the change in appearance of a triple chain in which the crimped segment is very short so the tip ornaments are close together.

Further detailed description of the invention by way of example of the preferred embodiments and not by way of limitation will be made with reference to the drawings in which like parts are identified with like numerals.

Turning to FIGS. 1, 2, 3a and 2b, soldered wire rings 1 are transformed through the following steps into the completed teardrop-shaped links 6 of a jewelry chain 8. A segment 2 of the ring 1 is crimped by pinching with pliers. This crimped segment 2 provides a surface upon which an ornament is formed or placed. FIG. 2 illustrates two links of different size which may be used to form chains, e.g., chains of different sized links, or chains having alternating links of different size. FIGS. 3a, 3b, 5, and 6 show a bead 3 as the tip ornament 5. In FIG. 4 tip ornament 5 is a tube bezel 7 into which a jewel may be set. Bead ornament 3 may be formed by heating the tip of the flattened segment 2, or a preformed bead may be secured by soldering it onto the face or tip of the crimped segment 2 (see FIG. 3a). As FIG. 4 illustrates, the ornament 5 may be a tube bezel that is soldered (filet 11) on the tip or face of the flattened segment 2.

Referring now to FIGS. 3a and 3b, the crimped segment 2 is bent upwardly at a 15–60 degree angle with respect to a plane upon which the loop 4 is resting. This may be done either before or after the forming or securing of the ornament 5 (bead 3 or tube bezel 7) on the link, and the bend angle is preferably 30°±10°.

FIG. 5 illustrates a section of the complete jewelry chain 8. The teardrop-shaped links 6 are assembled by putting the ornament 5, e.g., bead 3 or tube bezel 7 of one link 6 through the loop 4 of an adjacent link and crimping the loop so that the bead 3 of the adjacent link cannot pass through the crimped loop of the next sequential link 6'. The crimp is not so tight that the links cannot move with respect to each other. Thus, an articulated chain is formed.

FIG. 6 illustrates a tandem chain. Single teardrop-link elements 6a and 6b may be connected parallel to each other, e.g., by joining adjacent loops 4 with solder joint 9 thereby forming a double, triple, etc., chain of greater width. The preferred embodiment is to cast the teardrop-shaped links, either as single links for a single chain, or as tandem (double, triple, etc.) links which are joined at their loops 4 so that when assembled to similar tandem link segments 10, form a chain of increased width.

EXAMPLE

A piece of 22 gauge silver wire is wrapped around a three-eighth inch dowel to form a coil. The silver may be pure (fine) silver or sterling; gold wire (10Kt to 24Kt) may also be used, with 18–22Kt preferred. The coil is then cut once lengthwise so as to provide individual C-shaped ring precursors. The cut ends of the precursors are soldered to form rings (see FIG. 1). Then a segment of each ring is crimped with pliers so as to form an approximate teardrop shape with one end having parallel wires and the other end having a 3/16" inner diameter loop (see FIG. 2). A bead, tube bezel or ornament one-eighth inch in diameter is formed or secured at the tip of the crimped end. The crimped end is bent at about a 30°±10° angle either before or after the formation of the tip ornament. The teardrop-shaped links are then assembled by inserting the bead of one link inside the loop of an adjacent link. The loop is then crimped to secure the enclosed bead. A number of completed chains or individual teardrop-shaped links may be assembled parallel to each other and soldered at touching loops in order to form a wider chain. Alternatively, teardrop-shaped links may be lost-wax cast as single links, or as tandem (double, triple, etc.) links which are joined at the sides of the loops. The tandem links, when assembled to similar links, form a chain of increased width.

Various alternatives are shown in FIGS. 7 through 12. In FIG. 7a and 7b the length of the crimped portion 2 may be shortened so the resulting aesthetic appearance of the chain is varied. The FIG. 7a, with a long crimped segment, the double-wire link nature of the chain predominates, whereas in FIG. 7b the tip ornaments, here beads, predominate.

Figure 9:
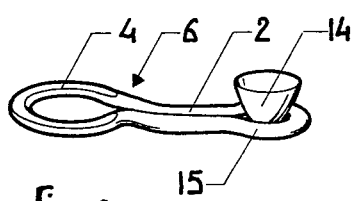
FIG. 9 shows a variation of the chain link in which the crimp is medial the tip end and the loop and a cup bezel is soldered at the tip end.
Figure 8A:
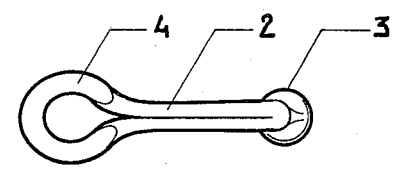
FIGS. 8a and 8b are a plan and side view respectively of a link in which the loop end is flattened.
Figure 8B:
Figure 10A:
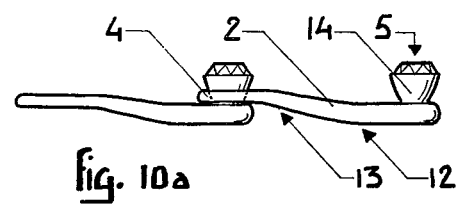
FIGS. 10a and 10b are a side and plan view respectively of the link of FIG. 9 joined as a chain showing how the flattened loop segment is crimped around the cup bezel.
Figure 10B:
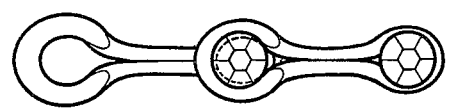

FIGS. 8a, 8b, 10a and 10b show a link in which the loop end 4 is flattened from the bottom side. The center of the crimped segment 2 is then bent upwardly about 15° as at 12 in FIG. 10a, and the loop end 4 is bent parallel to the horizontal at 13 in FIG. 10a. As with the other chains, the loop end may then be crimped around the ornaments, here a cup bezel 14. FIG. 9 illustrates the method of securing a cup bezel 14 to the link. The ring 1 is crimped intermediate the tip and the loop to leave a small loop 15 into which the cup bezel 14 nests and is soldered.

Figure 11B:
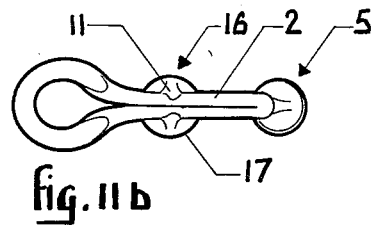
FIGS. 11a, b and c are perspective and bottom views respectively of an alternate link showing a tube bezel soldered intermediate the tip ornament and the loop, with FIG. 11c showing a double link assembly having an oval bezel joining both links.
Figure 11A:
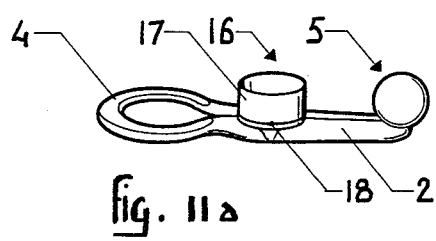
Figure 11C:
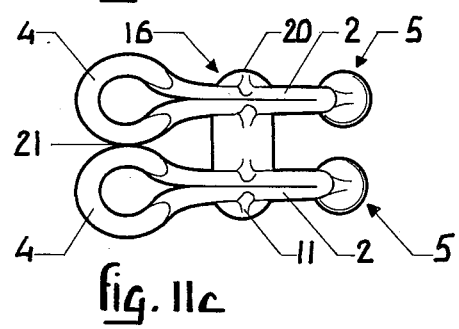
Figure 12:
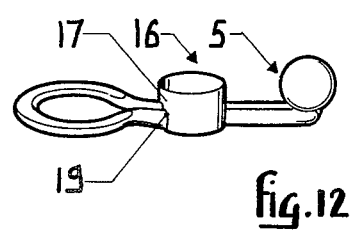
FIG. 12 shows the crimped segment passing through the bezel.

FIGS. 11a, b and c and FIG. 12 show still another embodiment in which another ornament 16 is secured on the crimped segment 2 intermediate the tip ornament 5 and the loop 4. In the case of FIGS. 11a and 11b (a bottom view) a cylindrical bezel 17 having a bottom 18 is soldered onto the intermediate section of the crimped segment 2, solder filets 11 being seen in FIG. 11b. In FIG. 12 the bezel 17 has a notched area 19 so that the bezel fits over the crimped segment 2. This bezel may, but need not have a bottom. FIG. 11c shows an oval bezel 20 soldered across the intermediate portions of crimped segments 2 of two links set side by side so that it forms a tandem link for a double-wide chain. In this case no soldering of the ring segments 4 at area 21 need be done, but may be if desired.

The resulting chains, while relatively simple to make, are quite attractive, and have an appearance of classical silver or gold work.

It should be understood that various modifications within the scope of this invention can be made by one of ordinary skill in the art without departing from the spirit thereof. For example, a larger ornament may be soldered on the bead after the chain is assembled. Likewise, bead and bezel links may be alternated in a single chain. The links may be formed by soldering a small ring to a straight wire, double wire, or strip of flat sheet placed against the outer surface of the ring and extending radially thereof. I, therefore, wish my invention to be defined by the scope of the claims as broadly as the prior art will permit and in view of this specification.

I claim:

1. An improved jewelry chain link comprising a continuous wire loop having a generally teardrop shape and including a crimped segment of generally straight parallel wires in substantial contact along their length and at least one loop segment, said crimped segment as seen in elevation being bent from a 15 to a 60 degree angle with respect to the loop segment of the link, and having a tip element disposed on one end of said crimped segment, said tip element being smaller than the inner diameter of said loop segment and providing an undercut into which the loop segment of a second link is articulatably receivable upon squeezing said loop segment thereabout.

2. The improved link as in claim 1 wherein said tip element is a bead.

3. The improved link as in claim 1 wherein said wire link is a double link comprising at least two links joined side by side at adjacent loop segments.

4. An improved link as in claim 1 wherein said link is a cast link.

5. An improved link as in claim 1 wherein said loop segment is flattened and displaced parallel to the crimped segment, said bend occurring at the juncture of said flattened loop segment and said crimped segment.

6. An improved link as in claim 1 wherein a secondary ornament is secured intermediate said tip element and said loop.

7. An improved link as in claim 6 wherein said link is a double link comprising two links side by side and said secondary ornament is a bezel extending across and being secured to both links.

8. An improved link as in claim 11 wherein said link is crimped intermediate said loop and said tip to form a small loop at said tip, and said bezel is a cup bezel nested in and secured to said small loop.

9. A link as in claim 1 wherein the length of the crimped segment is a predetermined length to provide spacing of the tip elements of adjacent links assembled into a chain wherein their design element aspect predominates over the crimped segment aspect.

10. A method of forming jewelry chains comprising a plurality of links, each of said links comprising a continuous wire loop having a generally teardrop shape and including a crimped segment of generally straight parallel wires in substantial contact along their length and at least one loop segment, said crimped segment as seen in elevation being bent from a 15 to a 60 degree angle with respect to the loop segment of the link, and having a tip element disposed on one end of said crimped segment, said tip element being smaller than the inner diameter of said loop segment and providing an undercut into which the loop segment of a second link is articulatably receivable upon squeezing said loop segment thereabout, said method comprising the steps of:

(a) inserting the tip element portion of a first of said links through the loop of a second of said links;

(b) crimping the loop of said second link sufficiently to secure the enclosed tip element of said first link and to permit sufficient movement to provide an articulated chain; and (c) repeating these steps with additional links to form single or tandem chains of any desired length.

11. The improved link as in clam 1 wherein said tip element is a bezel for securing a stone.

* * * * *